United States Patent [19]

Setsuie et al.

[11] Patent Number: 4,661,572

[45] Date of Patent: Apr. 28, 1987

[54] PROCESS FOR PRODUCING ACRYLONITRILE-BASED PRECURSORS FOR CARBON FIBERS

[75] Inventors: Takashi Setsuie; Takeji Otani; Tadao Kobayashi, all of Hiroshima, Japan

[73] Assignee: Mitsubishi Rayon Co., Ltd., Tokyo, Japan

[21] Appl. No.: 679,114

[22] Filed: Dec. 6, 1984

[30] Foreign Application Priority Data

Nov. 4, 1982 [JP] Japan .................. 57-193696

[51] Int. Cl.$^4$ .................. C08F 4/30; C08F 220/44
[52] U.S. Cl. .................. 526/229; 526/342
[58] Field of Search .................. 526/229, 342

[56] References Cited

U.S. PATENT DOCUMENTS

| | | | |
|---|---|---|---|
| 3,686,112 | 8/1972 | Vrancken | 526/229 |
| 4,001,382 | 1/1977 | Matsumura et al. | |
| 4,216,301 | 8/1980 | Canterino | 526/229 |

FOREIGN PATENT DOCUMENTS 49-5619  2/1974  Japan .................. 526/229

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A process for producing acrylonitrile-based copolymers for carbon fibers is described, which comprises producing substantially metal-free acrylonitrile-based copolymers containing as essential components at least 95% by weight of acrylonitrile and from 0.5 to 3% by weight of a carboxyl group-containing polymerizable unsaturated monomer, at least 20% of the carboxyl groups being substituted with ammonium ions, in the presence of a redox polymerization initiator comprising ammonium persulfate and ammonium sulfite and, thereafter, spinning the acrylonitrile-based copolymer. The present invention permits production of acrylonitrile-based copolymers free of metal impurities responsible for the formation of defects in the ultimate carbon fibers. High performance carbon fibers can be produced without the need of any additional steps.

6 Claims, No Drawings

PROCESS FOR PRODUCING ACRYLONITRILE-BASED PRECURSORS FOR CARBON FIBERS

FIELD OF THE INVENTION

The present invention relates to a process for producing acrylonitrile-based precursors for carbon fibers. More particularly, it is concerned with a process for producing acrylonitrile-based precursors free of impurities which result in deterioration of strength and heat stability of the ultimate carbon fibers.

BACKGROUND OF THE INVENTION

Carbon fibers have received increasing attention as reinforcing materials due to their light weight and excellent mechanical properties such as strength and modulus of elasticity as compared with conventional reinforcing materials such as glass fibers. They are widely used at present in the production of shafts for golf clubs, fishing rods and racket frames, for example. It has been desired to reduce their production costs and also to develop high performance carbon fibers so that they can be used as industrial materials in the fields of air crafts and space technology, for example.

It is known that impurities such as metals are responsible for the formation of defects in carbon fibers, i.e., a reduction in their strength and thermal stability. Therefore, in order to produce high performance carbon fibers, various investigations have been made to produce acrylonitrile-based precursors which are free of such impurities.

In the production of carbon fibers, various techniques are employed to proceed uniformly and rapidly the formation of naphthyridine-like structures in the carbon fibers at an initial stage of the production thereof, i.e., a so-called treatment to impart flame resistance. Of these techniques, a method is widely used in which carboxyl group-containing polymerizable unsaturated monomers are copolymerized with acrylonitrile. Carboxyl groups contained in the polymers, however, tend to catch metals, in particular, alkali metals at the steps of polymerization, spinning, and drawing, thereby causing the abovedescribed defects and in turn a reduction of strength of the carbon fibers. In order to overcome this problem, Japanese Patent Publication No. 33211/76 discloses a method in which some of the carboxyl groups are substituted with ammonium ions. This method, however, has several disadvantages. For example, a degree of substitution of the terminal hydrogen of the carboxyl group is from 0.1 to 15%, and since the substitution process is carried out as a post-treatment after the spinning process, it not only results in increasing the number of steps but also exerts adverse influences on the ultimate carbon fibers.

SUMMARY OF THE INVENTION

As a result of various investigations to overcome the above problems, it has been found that high performance carbon fibers can be produced by heating acrylonitrile-based precursors which are prepared by spinning acrylonitrile-based copolymers containing a specific amount of carboxyl groups, part of the carboxyl groups being substituted with ammonium ions, so that the acrylonitrile-based copolymers do not substantially contain metals, in particular, alkali metals.

Accordingly, an object of the present invention is to provide a process for producing a substantially impurity-free acrylonitrile-based precursor for a carbon fiber.

The process for producing an acrylonitrile-based precursor for a carbon fiber according to the present invention comprises producing a substantially metal-free acrylonitrile copolymer containing as essential components at least 95% by weight of acrylonitrile and from 0.5 to 3% by weight of a carboxyl group-containing polymerizable unsaturated monomer, at least 20% of the carboxyl groups being substituted with ammonium ions, in the presence of a redox polymerization initiator comprising ammonium persulfate [$(NH_4)_2S_2O_8$] and ammonium sulfite ($NH_4HSO_3$), and then spinning the acrylonitrile copolymer.

DETAILED DESCRIPTION OF THE INVENTION

The acrylonitrile content in the acrylonitrile-based copolymer as used herein must be at least 95% by weight. If the acrylonitrile content is less than 95% by weight, an acrylontrile-based precursor which has a good fibril structure controlling the performance of the ultimate carbon fiber cannot be obtained.

The carboxyl group-containing polymerizable unsaturated monomer should be polymerized such taht the monomer content of the resulting acrylonitrile-based copolymer falls within the range of from 0.5 to 3% by weight. This is for the reason that high performance carbon fibers can be produced through short time heating only when this requirement is satisfied.

Example of such monomers are acrylic acid, methacrylic acid, itaconic acid, crotonic acid, maleic acid, mesaconic acid and citraconic acid.

It is further required in the present invention that at least 20%, preferably at least 25%, and more preferably at least 30%, of carboxyl groups contained in the acrylonitrile-based copolymer are substituted with ammonium ions. If the degree of substitution is less than 20%, the acrylonitrile-based copolymer readily catches therein metals, in particular alkali metals, at the steps of polymerization, spinning and drawing, causing the formation of defects in the resulting acrylonitrile-based precursor. This makes it impossible to produce substantially metal-free carbon fibers.

The acrylonitrile-based copolymer of the present invention in which at least 20% of carboxyl groups are substituted with ammonium ions can be easily produced by using as a polymerization initiator a redox initiator comprising ammonium persulfate [$(NH_4)_2S_2O_8$] and ammonium sulfite ($NH_4HSO_3$) without any special processes.

The amount of the polymerization initiator added is such that the amount of ammonium persulfate used is from 0.2 to 0.8% by weight, preferably from 0.3 to 0.6% by weight and more preferably from 0.4 to 0.6% by weight, based on the total weight of the monomers, and the weight ratio of ammonium persulfate to ammonium sulfite (ammonium persulfate/ammonium sulfite) is from 1:1 to 1:6, preferably from 1:1.5 to 1:5 and more preferably from 1:1.5 to 1:4. If the amount of ammonium persulfate added is less than 0.2% by weight, the degree of substitution of carboxyl groups with ammonium is undesirably low. On the other hand, if it is more than 0.8% by weight, although the degree of substitution is sufficiently high, an acrylonitrile-based copolymer having a low degree of polymerization is merely obtained and high performance carbon fibers cannot be produced therefrom. If the ammonium persulfate/ammonium sulfite ratio is more than 1:1 or less than 1:6, the degree of polymerization of the resulting acrylonitrile-based copolymer is not proper or its stability is undesirably low.

The acrylonitrile-based copolymer as used herein may further contain from 2 to 4.5% by weight of other polymerizable unsaturated monomers such as allyl alcohol, methallyl alcohol, oxyethylacrylonitrile, methyl acrylate, ethyl acrylate, methyl methacrylate, ethyl methacrylate, acrylamide, methacrylamide, N-methylolacrylonitrile, dimethylamide, ethylacrylamide and allyl chloride. Depending on the purpose, these monomers can be used alone or in combination with each other.

The thus-produced acrylonitrile-based copolymer is dissolved in substantially metal-free solvents such as dimethylformamide, dimethylacetamide, dimethyl sulfoxide, γ-butyrolactone, ammonium rhodanate and nitric acid, to obtain a spinning solution and the solution is spun by procedures such as dry spinning, wet spinning and dry-wet spinning, drawn, followed by washing to produce the desired acrylonitrile-based precursor.

This acrylonitrile-based precursor is heated in an oxidizing atmosphere at 200° to 400° C. to produce a flame-retardant string and the string is then heated in a non-oxidizing atmosphere at 600° to 1,500° C. to produce a carbon fiber. If necessary, the carbon fiber is further subjected to a graphitization treatment in an inert atmosphere at 3,000° C. or less. The thus-produced carbon fiber is a substantially metal-free carbon fiber which has high strength and modulus of elasticity, is free from the string defects, and can exhibit uniform characteristics.

The present invention is described in greater detail by reference to the following examples.

EXAMPLE 1 AND COMPARATIVE EXAMPLE 1

An acrylonitrile-based copolymer (Copolymer I) consisting of 98% by weight of acrylonitrile (AN) and 2% by weight of methacrylic acid (MAA) was produced by an aqueous suspension polymerization method using 0.55% by weight of ammonium persulfate as an oxidizing agent, 0.83% by weight of ammonium sulfite as a reducing agent and 0.045% by weight of sulfuric acid as a pH adjustor, all percentages being based on the total weight of the monomers.

A comparative acrylonitrile-based copolymer (Copolymer II) was produced in the same manner as above except that, as a polymerization initiator, 0.55% by weight of potassium persulfate as an oxidizing agent and 1.27% by weight of sodium sulfite as a reducing agent were used.

The properties of Copolymers I and II obtained are shown in Table 1 below.

TABLE 1

| | Copolymer | Reduced Viscosity (η red) | Alkali Metal Content | Degree of Substitution of Carboxyl Groups with Ammonia (%) |
|---|---|---|---|---|
| Example 1 | I | 1.85 | Undetectable | 40 |
| Comparative Example 1 | II | 1.82 | 540 ppm | 0 |

Note:
Reduced viscosity η red (= η sp/c): Measured in a 0.5% DMF solution at 25° C.
Alkali metal content: Measured by the conventional atomic absorption method.
Degree of substitution of carboxyl groups with ammonia: Measured by the titration method and thermal decomposition gas chromatography.

Each copolymer was dissolved in dimethylformamide to prepare a 26% by weight solution. This solution was once discharged in the air through a spinning nozzle (hole diameter: 0.15 mm; number of holes: 2,000), allowed to run 5 mm, introduced into a 75% by weight aqueous solution of dimethylformamide maintained at 30° C. to coagulate, drawn at a speed of 15 m/min, stretched to 6 times while continuously washing with boiling water, coated with an oil, made dense by drying on a hot roll having a surface temperature of 130° C., and wound up to produce an acrylonitrile-based precursor (monofilament: 1.5 denier).

The thus-produced precursor was made flame retardant by heating in air maintained at 230° to 270° C. and then was subjected to a carbonization treatment in a nitrogen ($N_2$) stream by applying a temperature-raising gradient of from 600° to 1,250° C. The monofilament performance of the carbon fiber is shown in Table 2.

TABLE 2

| | Copolymer | Specific Gravity (g/ml) | Alkali Metal Content | Tensile Strength (kg/mm$^2$) (CV %) | Tensile Modulus (ton/mm$^2$) (CV %) |
|---|---|---|---|---|---|
| Example 1 | I | 1.815 | Undetectable | 504 (2.2) | 25.4 (1.0) |
| Comparative Example 1 | II | 1.803 | 450 ppm | 369 (3.1) | 24.2 (1.5) |

EXAMPLE 2

Acrylonitrile-based copolymers (Copolymers III to VII) as shown in Table 3 were produced using different amounts of the polymerization initiator.

TABLE 3

| | Amount of Initiator | | | | Degree of Substitution |
|---|---|---|---|---|---|
| Copolymer No. | $(NH_4)_2S_2O_8$ (based on the weight of the monomers) | $(NH_4)_2S_2O_8$/ $NH_4HSO_3$ Ratio | Reduced Viscosity (η red) | Alkali Metal Content | of Carboxyl Groups with Ammonium (%) |
| III | 0.5 | 1/1.5 | 2.23 | Undetectable | 34 |
| IV | 0.6 | 1/1.5 | 1.73 | Undetectable | 40 |
| V | 0.3 | 1/4.3 | 1.91 | 5 ppm | 25 |
| VI | 0.4 | 1/4.3 | 1.63 | Undetectable | 43 |

TABLE 3-continued

| Copolymer No. | Amount of Initiator | | Reduced Viscosity ($\eta$ red) | Alkali Metal Content | Degree of Substitution of Carboxyl Groups with Ammonium (%) |
| --- | --- | --- | --- | --- | --- |
| | $(NH_4)_2S_2O_8$ (based on the weight of the monomers) | $(NH_4)_2S_2O_8/$ $NH_4HSO_3$ Ratio | | | |
| VII | 0.15 | 1/1.5 | 2.32 | Undetectable | 13 |

Note:
Copolymers III to VI: Examples of the present invention
Copolymer VII: Comparative example Copolymers III to VII were spinned and calcined in the same manner as in Example 1 to produce carbon fibers. The monofilament performance of these carbon fibers is shown in Table 4.

TABLE 4

| Copolymer No. | Specific Density (g/ml) | Alkali Metal Content | Tensile Strength (kg/mm$^2$) (CV %) | Tensile Modulus (ton/mm$^2$) (CV %) |
| --- | --- | --- | --- | --- |
| III | 1.814 | Undectable | 498 (4.6) | 25.9 (0.8) |
| IV | 1.812 | " | 470 (3.4) | 25.6 (1.7) |
| V | 1.817 | 10 ppm | 475 (2.6) | 26.1 (0.8) |
| VI | 1.813 | Undectable | 450 (3.1) | 26.3 (1.0) |
| VII | 1.812 | " | 378 (6.2) | 24.8 (1.2) |

Note:
Copolymers III to VI: Examples of the present invention
Copolymer VII: Comparative example It can be seen from Table 4 that the carbon fibers of the present invention have a high strength.

COMPARATIVE EXAMPLE 2

The copolymer produced in Example 1 was treated with an aqueous solution of sodium hydrogencarbonate and an aqueous ammonium solution and, thereafter, spinned and headed. The results obtained are shown in Table 5 below.

TABLE 5

| Copolymer No. | Processing Solution | Na Content (ppm) | Degree of Substitution with Ammonium Ion (%) | Carbon Fiber | |
| --- | --- | --- | --- | --- | --- |
| | | | | Strength (kg/mm$^2$) | Modulus (ton/mm$^2$) |
| VIII | NaHCO$_3$ | 1,250 | 0.5 | 368 | 24.4 |
| IX | NaHCO$_3$ | 426 | 7 | 420 | 24.7 |
| X | NaHCO$_3$ | 126 | 14 | 425 | 24.5 |
| XI | Ammonia | Undectable | 62 | 458 | 24.8 |
| XII | Ammonia | Undectable | 100 | 468 | 25.0 |

It can be seen from Table 5 that the post-treatment provides an effect equal to or inferior to that of the present invention. This requires an additional step, which is not desirable from productivity or an economic standpoint.

The acrylonitrile-based copolymer of the present invention is a substantially impurity (in particular, alkali metal)-free polymer and permits the production of carbon fibers free of the string defects and having a high strength. These high performance carbon fibers will find numerous used not only in the production of sporting goods but also in the production of industrial materials for air crafts and space rockets, for example.

While the invention has been described in detail and with reference to specific embodiments thereof, it will be apparent to one skilled in the art that various changes and modifications can be made therein without departing from the spirit and scope thereof.

What is claimed is:

1. A process for producing an acrylonitrile-based precursor for a carbon fiber having an undetectable amount of alkali-metal impurities therein which comprises:
   (a) producing a essentially metal-free acrylonitrile-based copolymer containing as essential components at least 95% by weight of acrylonitrile and from 0.5 to 3% by weight of a carboxylic acid group-containing polymerizable unsaturated monomer, with at least 20% of the carboxyl groups being substituted with ammonium ions by aqueous suspension copolymerization of acrylonitrile and a carboxyl group containing copolymerizable unsaturated monomer, in the presence of a redox polymerization initiator consisting of ammonium persulfate and ammonium sulfite, wherein the amount of the ammonium persulfate added is from 0.2 to 0.8% by weight based on the weight of the monomers, and the weight ratio of ammonium persulfate to ammonium sulfite is from 1:1 to 1:6, and
   (b) dissolving the acrylonitrile-based polymer in a sustantially metal-free solvent in which it is soluble to obtain a spinning solution and
   (c) spinning the resultant solution to obtain the acrylonitrile-based precursor for carbon fiber.

2. The process as claimed in claim 1, wherein the carboxyl group-containing polymerizable unsaturated monomer is at least one selected from the group consisting of acrylic acid, methacrylic acid, itaconic acid, crotonic acid, maleic acid, mesaconic acid and citraconic acid.

3. The process as claimed in claim 2, wherein at least 25% of the carboxyl groups are substituted with ammonium ions.

4. The process as claimed in claim 3, wherein at least 30% of the carboxyl groups are substituted with ammonium ions.

5. The process as claimed in claim 3, wherein at least 34% of the carboxyl groups are substituted with ammonium ions.

6. The process as claimed in claim 1, wherein the amount of ammonium persulfate used is from 0.3 to 0.6% by weight based on the total monomer weight, and the weight ratio of ammonium persulfate to ammonium sulfite is from 1:1.5 to 1:5.

* * * * *